United States Patent
Litman et al.

(10) Patent No.: US 11,008,478 B2
(45) Date of Patent: *May 18, 2021

(54) INK COMPOSITION FOR USE ON NON-ABSORBENT SURFACES

(71) Applicant: R.R. DONNELLEY & SONS COMPANY, Chicago, IL (US)

(72) Inventors: Stanley Litman, Amherst, NY (US); Pamela Geddes, Alden, NY (US); Morgan Edwards, Hilton, NY (US); Michael Carson, Jr., Tonawanda, NY (US); Kevin J. Hook, Grand Island, NY (US)

(73) Assignee: R. R. Donnelley & Sons Company, Chicago, IL (US)

( * ) Notice: Subject to any disclaimer, the term of this patent is extended or adjusted under 35 U.S.C. 154(b) by 33 days.

This patent is subject to a terminal disclaimer.

(21) Appl. No.: 15/861,092

(22) Filed: Jan. 3, 2018

(65) Prior Publication Data

US 2018/0118962 A1    May 3, 2018

Related U.S. Application Data

(63) Continuation of application No. 14/872,836, filed on Oct. 1, 2015, now Pat. No. 9,868,869.

(51) Int. Cl.
| | | |
|---|---|---|
| *C09D 11/102* | (2014.01) | |
| *C09D 11/033* | (2014.01) | |
| *C09D 11/037* | (2014.01) | |
| *C09D 11/38* | (2014.01) | |

(52) U.S. Cl.
CPC .......... *C09D 11/102* (2013.01); *C09D 11/033* (2013.01); *C09D 11/037* (2013.01); *C09D 11/38* (2013.01)

(58) Field of Classification Search
None
See application file for complete search history.

(56) References Cited

U.S. PATENT DOCUMENTS

| | | |
|---|---|---|
| 3,450,791 A | 6/1969 | Sekmakas et al. |
| 5,091,444 A | 2/1992 | Bauer et al. |
| 5,352,283 A | 10/1994 | Beach et al. |
| 5,397,387 A | 3/1995 | Deng et al. |
| 5,453,122 A | 9/1995 | Lyon |
| 5,556,925 A | 9/1996 | Kousaka et al. |
| 5,652,286 A | 7/1997 | Deng |
| 5,744,519 A | 4/1998 | Heraud et al. |
| 5,760,123 A | 6/1998 | Vogt-Birnbrich et al. |
| 5,800,601 A | 9/1998 | Zou et al. |
| 5,814,701 A | 9/1998 | Catena et al. |
| 5,825,391 A | 10/1998 | Yang |
| 5,874,488 A | 2/1999 | Wang et al. |
| 5,958,169 A | 9/1999 | Titterington et al. |
| 6,028,126 A | 2/2000 | Wang et al. |
| 6,060,541 A | 5/2000 | Anderson et al. |
| 6,069,218 A | 5/2000 | Vogt-Birnbrich et al. |
| 6,103,780 A | 8/2000 | Matzinger et al. |
| 6,136,382 A | 10/2000 | Kamen et al. |
| 6,136,890 A | 10/2000 | Carlson et al. |
| 6,179,417 B1 | 1/2001 | Lowry et al. |
| 6,312,858 B1 | 11/2001 | Yacobucci et al. |
| 6,437,041 B1 | 8/2002 | Bosch et al. |
| 6,531,228 B1 | 3/2003 | Bartelink et al. |
| 6,670,002 B1 | 12/2003 | Sekiguchi et al. |
| 6,682,779 B1 | 1/2004 | Wefringhaus et al. |
| 6,780,231 B2 | 8/2004 | Scholz et al. |
| 6,794,425 B1 | 9/2004 | Ellis et al. |
| H2113 H | 1/2005 | Nichols et al. |
| 6,852,763 B2 | 2/2005 | Noda |
| 6,863,389 B2 | 3/2005 | Merz et al. |
| 6,905,732 B1 | 6/2005 | Dunshee et al. |
| 7,022,385 B1 | 4/2006 | Nasser |
| 7,132,014 B2 | 11/2006 | Mizutani et al. |
| 7,176,248 B2 | 2/2007 | Valentini et al. |
| 7,374,605 B2 | 5/2008 | Chung et al. |
| 7,513,945 B2 | 4/2009 | Nakano et al. |
| 7,637,605 B2 | 12/2009 | Mukata et al. |
| 7,649,030 B2 | 1/2010 | Iu |
| 7,740,694 B2 | 6/2010 | Sharmin et al. |
| 7,785,410 B2 | 8/2010 | Renner et al. |
| 7,828,426 B2 | 11/2010 | Brust et al. |

(Continued)

FOREIGN PATENT DOCUMENTS

| | | |
|---|---|---|
| CN | 102134420 A | 7/2011 |
| CN | 104742552 A | 7/2015 |

(Continued)

OTHER PUBLICATIONS

EPO Communication dated Jul. 19, 2018, for Application No. 15 734 529.9-1102, Applicant R.R. Donnelley & Sons Company (3 pages).

Non-Final Office Action dated Jun. 14, 2018, for U.S. Appl. No. 15/321,954, Applicant, R.R. Donnelley & Sons Company (18 pages).

International Searching Authority, International Search Report and Written Opinion, dated Sep. 10, 2015, for International Application No. PCT/US2015/037750, Applicant, R.R. Donnelley & Sons Company (8 pages).

WIPO, Third Party Observation for International Application No. PCT/US2015/037750, Sep. 29, 2016, Applicant R.R. Donnelley & Sons Company (1 page).

(Continued)

*Primary Examiner* — Marc S Zimmer
(74) *Attorney, Agent, or Firm* — McCracken & Gillen LLC

(57) ABSTRACT

According to one aspect, an ink composition includes a colorant, one or more polymers such as a polyurethane siloxane, a surfactant, water, and a solvent. The ink composition has a total solids content of less than about 20% by weight. Further the ink has an initial surface tension of less than about 50 dynes per centimeter on application and the surface tension on drying should not increase by more than 20 percent.

17 Claims, No Drawings

(56) References Cited

U.S. PATENT DOCUMENTS

| | | | |
|---|---|---|---|
| 7,871,467 B2 | 1/2011 | Sano et al. |
| 7,872,060 B2 | 1/2011 | Schmid et al. |
| 7,942,960 B2 | 5/2011 | Sano et al. |
| 7,988,777 B2 | 8/2011 | Tanoue et al. |
| 8,025,918 B2 | 9/2011 | Broguiere et al. |
| 8,092,003 B2 | 1/2012 | Sloan |
| 8,142,559 B2 | 3/2012 | Robertson et al. |
| 8,187,371 B2 | 5/2012 | Brust et al. |
| 8,192,008 B2 | 6/2012 | Brust et al. |
| 8,267,505 B2 | 9/2012 | Jolly et al. |
| 8,313,572 B2 | 11/2012 | Oyanagi et al. |
| 8,430,492 B2 | 4/2013 | Falkner et al. |
| 8,465,580 B2 | 6/2013 | Tanoue et al. |
| 8,476,332 B2 | 7/2013 | Jeremic |
| 8,480,223 B2 | 7/2013 | Shibata |
| 8,492,456 B2 | 7/2013 | Chen et al. |
| 8,563,634 B2 | 10/2013 | Deiner et al. |
| 8,573,762 B1 | 11/2013 | Prasad |
| 8,574,356 B2 | 11/2013 | Kagata et al. |
| 8,623,126 B1 | 1/2014 | Brust et al. |
| 8,664,331 B2 | 3/2014 | Richards |
| 8,716,390 B2 | 5/2014 | Reisacher et al. |
| 8,759,418 B2 | 6/2014 | Li et al. |
| 8,841,357 B2 | 9/2014 | Nagahama et al. |
| 8,939,568 B2 | 1/2015 | Stoeva et al. |
| 8,940,821 B2 | 1/2015 | Brust et al. |
| 9,085,150 B2 | 7/2015 | Aoyama |
| 9,090,734 B2 | 7/2015 | Kraiter et al. |
| 9,187,665 B2 | 11/2015 | Vasudevan et al. |
| 9,228,096 B2 | 1/2016 | Overbeerk et al. |
| 9,249,326 B2 | 2/2016 | Robertson et al. |
| 9,309,438 B2 | 4/2016 | Lindekens et al. |
| 9,376,582 B1 | 6/2016 | Dannhauser et al. |
| 9,434,201 B2 | 9/2016 | Dannhauser et al. |
| 9,493,013 B2 | 11/2016 | Chen et al. |
| 9,868,869 B2 * | 1/2018 | Litman | C09D 11/033 |
| 2001/0037749 A1 | 11/2001 | Ogawa et al. |
| 2003/0144375 A1 | 7/2003 | Wu et al. |
| 2004/0085419 A1 | 5/2004 | Yau et al. |
| 2005/0025880 A1 | 2/2005 | Masuda |
| 2005/0182154 A1 | 8/2005 | Berge et al. |
| 2006/0001725 A1 | 1/2006 | Nagata et al. |
| 2006/0100308 A1 | 5/2006 | Yau et al. |
| 2006/0109327 A1 | 5/2006 | Diamond et al. |
| 2006/0257760 A1 | 11/2006 | Mori et al. |
| 2007/0142572 A1 | 6/2007 | Ogawa et al. |
| 2007/0289487 A1 | 12/2007 | Ham et al. |
| 2008/0006175 A1 | 1/2008 | King et al. |
| 2008/0081124 A1 | 4/2008 | Sano et al. |
| 2008/0207805 A1 | 8/2008 | Blease et al. |
| 2008/0207811 A1 | 8/2008 | Brust et al. |
| 2008/0226880 A1 | 9/2008 | Parra Pastor et al. |
| 2008/0227356 A1 | 9/2008 | Poruthoor et al. |
| 2008/0254228 A1 | 10/2008 | Kojima et al. |
| 2008/0317957 A1 | 12/2008 | Overbeek et al. |
| 2009/0169748 A1 | 7/2009 | House et al. |
| 2009/0169749 A1 | 7/2009 | Brust et al. |
| 2009/0182098 A1 | 7/2009 | Sano et al. |
| 2009/0213151 A1 | 8/2009 | Dannhauser et al. |
| 2009/0246484 A1 | 10/2009 | Kumagai et al. |
| 2009/0306285 A1 | 12/2009 | Li et al. |
| 2010/0239761 A1 | 9/2010 | Haenen et al. |
| 2011/0032303 A1 | 2/2011 | Li |
| 2011/0239903 A1 | 10/2011 | Sujeeth et al. |
| 2012/0001980 A1 | 1/2012 | Ichinose et al. |
| 2012/0004348 A1 | 1/2012 | Reisacher et al. |
| 2012/0021193 A1 | 1/2012 | Lecolley et al. |
| 2012/0108717 A1 | 5/2012 | Park et al. |
| 2012/0135209 A1 | 5/2012 | Becker et al. |
| 2012/0223999 A1 | 9/2012 | Kraiter et al. |
| 2012/0306976 A1 | 12/2012 | Kitagawa et al. |
| 2012/0314009 A1 | 12/2012 | Kashara |
| 2012/0321863 A1 | 12/2012 | O'Donnell et al. |
| 2012/0329921 A1 | 12/2012 | Vasudevan et al. |
| 2013/0021406 A1 | 1/2013 | Stoeva et al. |
| 2013/0162722 A1 | 6/2013 | Brust et al. |
| 2013/0165618 A1 | 6/2013 | Brust et al. |
| 2013/0201250 A1 | 8/2013 | Berge |
| 2013/0221288 A1 | 8/2013 | Liu et al. |
| 2013/0224445 A1 | 8/2013 | Donohoe et al. |
| 2013/0237661 A1 | 9/2013 | Brust et al. |
| 2013/0265376 A1 | 10/2013 | Gil-Torrente et al. |
| 2013/0286087 A1 | 10/2013 | Berge |
| 2013/0307914 A1 | 11/2013 | Chen et al. |
| 2014/0017461 A1 | 1/2014 | Matsuyama |
| 2014/0022321 A1 | 1/2014 | Komatsu |
| 2014/0037913 A1 | 2/2014 | Nagahama et al. |
| 2014/0134337 A1 | 5/2014 | Overbeerk et al. |
| 2014/0240399 A1 | 8/2014 | Saito et al. |
| 2015/0038641 A1 | 2/2015 | Gobelt et al. |
| 2015/0118452 A1 | 4/2015 | Ohashi et al. |
| 2015/0119510 A1 | 4/2015 | Eliyahu et al. |
| 2015/0183192 A1 | 7/2015 | Bhattacharya et al. |
| 2015/0191602 A1 | 7/2015 | Denda |
| 2015/0210859 A1 | 7/2015 | Denda et al. |
| 2015/0225285 A1 | 8/2015 | Domey et al. |
| 2015/0315393 A1 | 11/2015 | Xu et al. |
| 2016/0166446 A1 | 6/2016 | Warner et al. |
| 2018/0016743 A1 * | 1/2018 | Kido | C08L 53/005 |
| 2020/0047532 A1 | 2/2020 | Deighton et al. |

FOREIGN PATENT DOCUMENTS

| | | |
|---|---|---|
| EP | 1180540 | 2/2002 |
| EP | 1293545 | 3/2003 |
| EP | 2744834 | 12/2014 |
| EP | 2907967 | 8/2015 |
| EP | 3034312 | 6/2016 |
| JP | 2004-175918 | 6/2004 |
| JP | 2004-276569 | 10/2004 |
| JP | 2010 520324 | 6/2010 |
| WO | WO 2008/106148 A1 | 9/2008 |
| WO | WO 2009/025809 | 2/2009 |
| WO | WO 2010/114899 | 10/2010 |
| WO | WO 2013/026451 | 2/2013 |
| WO | WO 2016/111718 | 7/2016 |
| WO | WO 2016/117639 A1 * | 7/2016 |
| WO | WO 2019/036416 | 2/2019 |

OTHER PUBLICATIONS

International Searching Authority, International Preliminary Report on Patentability, dated Jan. 5, 2017, for International Application No. PCT/US2015/037750, Applicant, R.R. Donnelley & Sons Company (6 pages).

International Searching Authority, International Preliminary Report on Patentability, dated Apr. 12, 2018, for International Application No. PCT/US2015/053544, Applicant R.R. Donnelley & Sons Company (13 pages).

International Searching Authority, International Search Report and Written Opinion, dated Feb. 5, 2016, for International Application No. PCT/US2015/053544, Applicant R.R. Donnelley & Sons Company (20 pages).

European Patent Office Examination Report, dated Jan. 10, 2018, Application No. 15734529.9, Applicant R.R. Donnelley & Sons Company (5 pages).

M.J. Forrest, Chemical Characterisation of Polyurethanes, 1999 (1 page).

Mitsui Chemicals, Product Data Sheet for Takelac WS 6021, Dec. 18, 2017 (5 pages).

Mitsui Chemicals, Product Data Sheet for Takelac WS 4000, Dec. 18, 2017 (5 pages).

Mitsui Chemicals, Product Data Sheet for Takelac WS 5000, Dec. 18, 2017 (5 pages).

Wang Duoren, New Binder and Coating Chemicals, China Building Materials Industry Press, May 30, 2000, pp. 69-70, 1$^{st}$ Edition (original and translated) (8 pages).

(56) References Cited

OTHER PUBLICATIONS

First Chinese Office Action and translation (from Global Dossier) dated Jul. 27, 2020, for Chinese Patent Application No. 201580083542, Applicant R. R. Donnelley & Sons Company (22 pages).

* cited by examiner

INK COMPOSITION FOR USE ON NON-ABSORBENT SURFACES

CROSS REFERENCE TO RELATED APPLICATIONS

The present application is a continuation of Litman, et al., U.S. patent application Ser. No. 14/872,836, entitled "Ink Composition for Use On Non-Absorbent Surfaces" and filed Oct. 1, 2015. The entire contents of this application are incorporated herein by reference.

FIELD OF DISCLOSURE

The present subject matter relates generally to ink compositions, and more particularly, to ink compositions used in a printing system that enables high-speed printing on non-absorbent surfaces.

BACKGROUND

Aqueous inks have been used in the printing industry for limited commercial print applications. An increase in the use of aqueous inks is due in part to environmental concerns about volatile organic compounds (VOC's) that solvent based inks emit when dried. For print application on paper and other absorbent surfaces, the water is partially absorbed by the surface and this makes drying the ink after printing quicker. For non-absorbent surfaces, the use of aqueous based inks sometimes can create performance issues and also, it is more difficult to quickly dry these inks when the ink sits on top of the surface.

For printing processes that use aqueous inks, often the paper is coated to prevent the paper from deforming in the presence of the water. These coated papers still are somewhat absorbent and allow the aqueous vehicle to partially penetrate the surface. Non-absorbent surfaces that keep the water based vehicle on the surface include plastic films, metal films, and similar surfaces. In these surfaces, the printed material is heat treated to remove the vehicle or exposed to ultraviolet light after printing, but if the physical properties of the ink composition do not assist in the adherence of the ink to the surface, there will be poor performance of the ink during and after printing. Under such circumstances, it is desirable for the images on the non-absorbent surface to have long term durability. Long term durability refers to the ability of the ink to remain on the final product and resist water exposure, highlighting, rubbing, scratching, and other abrasions. During printing, there is a tendency for the ink to be disturbed by shear stresses as the printed product moves through subsequent cylinders and/or other elements of the high speed printing press.

SUMMARY

According to one embodiment of the present invention, an aqueous ink comprising: a first urethane silanol polymer and a second urethane silanol polymer; from about 0.5 to about 12% by weight of one or more colorants; from about 5 to about 35% by weight of a solvent; from about 0.03 to about 1.0% by weight of a pH modifier; and water, wherein the aqueous ink has a viscosity such that aqueous ink can be applied to a non-absorbent surface layer, wherein the first urethane silanol polymer is polycarbonate based and is about 5.5% by weight and the second urethane silanol polymer is polyester based and is about 0.3% by weight.

Aspect 2: the aqueous ink of aspect 1, wherein the viscosity is from about 4 to about 14 mPa-s.

Aspect 3: the aqueous ink of any of aspects 1 and 2, wherein one of the one or more polymers is a urethane silanol.

Aspect 4: the aqueous ink of any of aspects 1 through 3, further comprising from about 0.1 to about 5% by weight of a surfactant.

Aspect 5: the aqueous ink of any of aspects 1 through 4, further comprising from about 1 to about 20% by weight of a crosslinker.

Aspect 6: the aqueous ink of any of aspects 1 through 5, wherein the crosslinker is an iso-cyanate crosslinker.

Aspect 7: the aqueous ink of any of aspects 1 through 6, wherein one of the one or more polymers is a self-crosslinking urethane silanol.

Aspect 8: the aqueous ink of any of aspects 1 through 7, wherein the solvent is chosen from the group consisting of 1-(2-hydroxyethyl)-2-pyrrolidone, alcohols, polyols, glycerols, and glycols.

Aspect 9: the aqueous ink of aspect 5, wherein the surfactant is an ethoxylated molecule.

Aspect 10: the aqueous ink of any of aspects 1 through 9, wherein the pH modifier is dimethylethanolamine.

Aspect 11: the aqueous ink of any of aspects 1 through 10, wherein the ink has a dynamic surface tension at 25 degrees Celsius from about 20 to about 45 dynes/cm.

Aspect 12: an ink comprising: from about 0.5 to about 10% by weight of an epoxy resin; from about 4 to about 30% by weight of a solvent; and one or more metallic colorants, wherein the ink has a viscosity from about 1 to about 20 mPa-s such that the ink can be applied to a non-absorbent surface in a layer.

Aspect 13: the ink of aspect 12, wherein the viscosity is from about 4 to about 14 mPa-s.

Aspect 14: the ink of any of aspects 1278 and 13, wherein the solvent is dimethyl sulfoxide.

Aspect 15: the ink of any of aspects 12 through 14, wherein the epoxy resin is a bisphenol A epoxy resin.

Aspect 16: the ink of any of aspects 12 through 15, wherein the ink has a dynamic surface tension at 25 degrees Celsius from about 20 to about 35 dynes/cm.

Aspect 17: a method for high speed variable printing comprising the steps of: providing an aqueous ink, the aqueous ink comprising: a first urethane silanol polymer and a second urethane silanol polymer, wherein the first urethane silanol polymer is polycarbonate based and is about 5.5% by weight and the second urethane silanol polymer is polyester based and is about 0.3% by weight; from about 0.5 to about 12% by weight of a pigment; from about 5 to about 35% by weight of a solvent; from about 0.03 to about 1.0% by weight of a pH modifier; and water, wherein the aqueous ink has a viscosity from about 1 to about 20 mPa-s; and applying the aqueous ink onto a non-absorbent substrate in a first layer.

Aspect 18: the method of aspect 17, the method further comprising the step of applying the aqueous ink in a plurality of further layers.

Aspect 19: the method of any of aspects 17 and 18, wherein the aqueous ink further comprises from about 0.1 to about 5.0% by weight of a surfactant.

Aspect 20: the method of any of aspects 17 through 19, the method further comprising the step of applying heat to crosslink the one or more polymers of the aqueous ink.

According to another aspect, an ink composition includes a colorant, one or more polymers comprising polyurethane siloxane, water, and a solvent. The ink composition has a total solids content of less than about 20 percent by weight. Further, the ink has an initial surface tension of less than about 50 dynes per centimeter on application and the surface tension on drying should not increase by more than 20 percent.

According to another aspect, an ink composition adapted to be applied to a non-absorbent surface includes from about 0.5 percent to about 12 percent by weight of a colorant, from about 3 percent to about 15 percent by weight of a polyurethane siloxane, and an aqueous based solvent. Further the ink has an initial surface tension of less than about 50 dynes per centimeter on application and the surface tension on drying should not increase by more than 20 percent.

According to another aspect, an ink composition includes a colorant, an epoxy resin, and an aprotic solvent. The ink may additionally include a metallic pigment and have an initial surface tension of less than about 40 dynes per centimeter on application and the surface tension on drying should not increase by more than 20 percent.

Other aspects and advantages will become apparent upon consideration of the following detailed description and the attached drawings wherein like numerals designate like structures throughout the specification.

DETAILED DESCRIPTION

An ink composition of the present application includes a colorant, a polyurethane siloxane, a solvent, water, and optionally a crosslinker. The ink composition has a total solids content of less than about 20% by weight, and a ratio of colorant to polyurethane between about 2:1 and 1:2 by weight. Further the ink has an initial surface tension of less than about 50 dynes per centimeter on application and the surface tension on drying should not increase by more than 20%.

Such ink composition is suitable for use in a variety of high-speed printing systems. A non-absorbent print medium, such as metal foils, ceramics, plastics, highly coated papers or other similar substrates, receives ink using a variety of printing methods.

The ink composition has a viscosity such that the ink composition can be applied to a substrate using a variety of printing methods. The viscosity may range from about 1.0 to 20.0 cP, preferably from about 4.0 cP to about 6.0 cP, although the preferred viscosity may depend in part on the requirements of the print system to be used.

One important aspect of the present composition is that the initial surface tension of the ink be less than 50 dynes/cm. At this surface tension the ink will properly spread on the non-absorbent surface. It is preferred that the surface tension be less than 40 dynes/cm. Another important aspect is that on drying the surface tension of the ink not increase dramatically. It has been found that if the surface tension changes too greatly upon drying, the physical properties of the ink on the non-absorbent surface are degraded. In particular, the solvent resistance, the rub resistance and leveling of the ink on the non-absorbent surface are not satisfactory if the surface tension changes too much, more than 20%, on drying.

Suitable surface active agents to provide the above surface tension properties include nonionic compounds comprised of silicone, ethylene oxide (EO), and propylene oxide (PO) such as Silwet Hydrostable 212, available from Momentive Performance Products (Albany, N.Y.), fluorinated nonionics such as Multiwet VE-LQ-(AP), available from Croda Industrial Chemicals (East Yorkshire, England) and the like. These surface active agents can be present in amounts ranging from about 0.1 to 3.0% by weight, more preferably less than 1.0% by weight.

In other embodiments, the surfactant or surface modifying agent may include, for example, nonionic surfactants, such as poloxamer, ethoxylated acetylenediol, ethoxylated alcohols, or other ethoxylated surfactants. Any type of surfactant may be useful to include in the ink composition to impart the desired properties including anionic, nonionic, cationic, or other types of surfactants. In addition, leveling agents also can act as surface modifying agents in an amount of up to about 2.5% by weight.

The ethoxylated acetylenediol based surfactants suitable for use include Air Products' Surfynol® 400 series surfactants: Surfynol® 420, 440, 465, and 485, respectively. The Surfynol® 400 series surfactants by Air Products (Allentown, Pa.) are produced by reacting various amounts of ethylene oxide with 2,4,7,9-tetra-methyl-5-decyne-4,7-diol (Air Products' Surfynol® 104), a nonionic molecule with a hydrophilic section in the middle of two symmetric hydrophobic groups.

The ethoxylated alcohols based surfactants suitable for use include Tomadol® series surfactants by Air Products (Allentown, Pa.). Tomadol® ethoxylated alcohols are produced by a base-catalyzed condensation reaction of ethylene oxide with an alcohols of varying chain lengths ranging from $C_9$ to $C_{15}$.

In one embodiment, the ink composition may be printed in a heated environment of about 120 degrees Fahrenheit (~50 degrees Celsius).

In another embodiment the ink composition may be printed onto a substrate and heated by a platen. The platen may be heated to a temperature of about 100 degrees Fahrenheit (~40 degrees Celsius) or to a temperature of about 120 degrees Fahrenheit (~50 degrees Celsius). The substrate is then heated to a temperature greater than 220 degrees Fahrenheit (~100 degrees Celsius) for about ten minutes to unblock and enable crosslinking. The ink is then cured at about 300 degrees Fahrenheit (~150 degrees Celsius) for ten minutes.

Appropriate thickness is achieved by printing multiple layers prior to curing. The ink composition may be disposed in a layer having a thickness in the range from about 5 microns to about 15 microns. The desired ink thickness may be obtained by printing a number of layers of ink onto the substrate. In some embodiments, the thickness may be obtained by printing up to about 50 layers, preferably up to about 30 layers, and more preferably up to about 15 layers of ink over the substrate, although the number of layers depends on various factors such as, for example, selection of the means for applying the ink, fluid solids content of the ink composition, and mass flow rate.

The polymer (polyurethane siloxane) acts as a binder to stabilize the colorant on the print medium and provides increased long term durability of a final product. Immediate durability refers to the ability of the ink composition to bond to the print medium quickly and move through a high speed printing press without transferring to elements of the press.

Suitable polymers for the ink composition of the present application include urethane resin emulsions having a silanol group or a group capable of preparing a silanol group by hydrolysis, such urethane resins include Takelac® WS-5000 (polyester based), Takelac® WS-5100 (polycarbonate based), Takelac® WS-4000 (polycarbonate based), and Takelac® WS-6021 (polyether based), manufactured by Mitsui Chemicals, Inc. (Tokyo, Japan). These are self-crosslinking polyurethane dispersions that form siloxane bonds with the evaporation of water. Polymers may be self-crosslinking through heat and/or hydrolysis. Polymers may also be crosslinked via one or more crosslinkers or catalysts.

In certain embodiments, suitable crosslinkers include blocked isocyanates wherein the application of heat enables crosslinking. A suitable crosslinker is Trixene® Aqua BI 201 by Baxenden Chemicals Limited (Lancashire, England). This crosslinker becomes unblocked between 110 and 120 degrees Celsius.

Certain embodiments comprise an epoxy binder. Suitable epoxy resins include DER 684-EK40 by Dow Chemical Company (Midland, Mich.). This resin is formed by reacting epichlorohydrin with bisphenol A to form diglycidyl ethers of bisphenol A.

The colorant may be any conventional pigment or dye commercially available. Examples of suitable colorants include but, are not limited to, carbon black colorant such as Pro-Jet® Black APD1000 by FujiFilm (New Castle, Del.), magenta colorant such as Cab-O-Jet® 465 by Cabot Corp. (Boston, Mass.), cyan colorant such as Cab-O-Jet® 450 or 452 by Cabot Corp. (Boston, Mass.), or yellow colorant such as Cab-O-Jet® 470 by Cabot Corp. (Boston, Mass.) visibly opaque infra-red transmitting dyes such as Epolight 7527A by Epolin, Inc. (Newark, N.J.), white colorants composed of titanium dioxide such as Cyclojet White Ti-7510 and Cyclojet White TI-7530 by Lever Colors (Bensalem, Pa.), opacifiers such as Ludox® AS 40 by Grace (Columbia, Md.), and metallic colorants containing aluminum, silver, or gold such as Jetfluid® SB11025 and Jetfluid® SB11028 by Eckart GmbH (Hartenstein, Germany).

Visibly opaque infra-red transmitting dyes, such as Epolight 7527A, should transmit greater than 80% of light having a wavelength greater than 850 nm and should transmit between 5 and 15% of light having a wavelengths less than 550 nm.

The total solids content of the ink composition is less than about 20% by weight. The ink composition may include about 0.5 to about 12 percent by weight of a colorant and about 3 to about 15 percent by weight of a polymer (polyurethane siloxane) and crosslinker. The ratio of colorant to polymer and crosslinker may range from about 2:1 to about 1:2.

The ink composition of the present application may include water as a solvent. The composition may also include a water-soluble organic compound as a co-solvent. Suitable water-soluble or miscible organic components include: glycerin; alcohols, such as methyl alcohol, ethyl alcohol, n-propyl alcohol, isopropyl alcohol, n-butyl alcohol, sec-butyl alcohol, or tert-butyl alcohol; amides, such as dimethylformamide or dimethylacetamide; carboxylic acids; esters, such as ethyl acetate, methyl lactate, ethyl lactate, propyl lactate and ethylene carbonate; ethers, such as 2-butoxyethanol, tetrahydrofuran or dioxane; glycols, such as propylene glycol, and diethylene glycol; glycol esters; glycol ethers, such as propylene glycol methyl ether, dipropylene glycol methyl ether; ketones, such as acetone, diacetone, or methyl ethyl ketone; lactams, such as N-isopropyl caprolactam or N-ethyl valerolactam, 2-pyrrolidinone, N-methylpyrrolidinone, or N-(2-hydroxyethyl)-2-pyrrolidone; lactones, such as butyrolactone; organosulfides; sulfones, such as dimethylsulfone; organosulfoxides, such as dimethyl sulfoxide or tetramethylene sulfoxide; and derivatives thereof and mixtures thereof.

Additional contemplated components in the ink composition include a solvent, a preservative such as Proxel® GXL by Arch Biocides (Smyrna, Ga.), a humectant (e.g. propylene glycol), a biocide, a colorant, a polymer, a leveling agent, a salt, an inorganic compound, an organic compound, water, a viscosity adjuster such as Walocel® CRT 30 by Dow Chemical Company (Midland, Mich.), a pH modifier such as diethanolamine or triethanolamine, and/or any combination thereof.

The following examples further illustrate the disclosure but, of course, should not be construed as in any way limiting its scope.

EXAMPLE 1

A black ink composition useful in the present disclosure was prepared having the following formulation:

35.7% by weight carbon black dispersion (Fuji APD 1000 Carbon Black) (14% solids), 28.4% by weight deionized water, 19.0% by weight polymer dispersion (Takelac® AC WS-4000) (29% solids), 15.0% by weight humectant (2-hydroxyethyl pyrrolidone), 1.0% by weight polymer dispersion (Takelac® AC WS-5000) (30% solids), 0.8% by weight surfactant (Silwet® Hydrostable 212), and 0.08% by weight pH modifier (dimethylethanolamine)

The water and hydroxyethyl pyrrolidone (HEP) were vigorously mixed and the polymer, pH modifier, and pigment were added very slowly. Later, the surfactant was added. After an additional period of vigorous mixing, the ink was finely filtered with a common filter system known to those having ordinary skill in the art of ink production.

Viscosity of the ink at 32 degrees Celsius was 5.13 cP and the pH was 9.08. Surface tension at 25 degrees Celsius was 36.0 dynes/cm as measured using a SensaDyne tensiometer.

EXAMPLE 2

A black infrared transmitting ink composition useful in the present disclosure was prepared having the following formulation:

42.9% by weight deionized water, 25.0% by weight polymer dispersion (Takelac® AC WS-4000) (29% solids), 17.0% by weight humectant (2-hydroxyethyl pyrrolidone), 10.0% by weight colloidal silica dispersion (Ludox® AS-40) (40% solids), 5.0% by weight visibly opaque IR transmitting dye solution (20% Epolight 7527A in hydroxyethyl pyrrolidone solution), and 0.1% by weight pH modifier (dimethylethanolamine)

The dye solution and HEP were vigorously mixed and the polymer was added very slowly. After a period of vigorous mixing, the deionized water was added. Subsequently, the pH modifier was added and later the crosslinker was added. After a period of mixing, the silica dispersion was added and after an additional period of vigorous mixing, the ink was filtered.

Viscosity of the ink at 32 degrees Celsius was 4.50 cP and the pH was 9.72. Surface tension at 25 degrees Celsius was 56.0 dynes/cm.

EXAMPLE 3

A first white ink composition useful in the present disclosure was prepared having the following formulation:
33.7% by weight deionized water,
19.7% by weight humectant (2-hydroxyethyl pyrrolidone),
14.8% by weight titanium oxide dispersion (Cyclojet White TI-7510),
12.7% by weight polymer dispersion (Takelac® AC WS-4000) (29% solids),
11.9% by weight crosslinker dispersion (Trixene® BI 201) (40% solids),
6.4% by weight colloidal silica dispersion (Ludox® AS-40) (40% solids),
0.4% by weight pH modifier (dimethylethanolamine, 50% in water),
0.3% by weight surfactant (Silwet® Hydrostable 212), and
0.3% by weight preservative (Proxel® GXL)

The titanium oxide dispersion and the silica dispersion were mildly mixed and the polymer and crosslinker were added very slowly. After mild mixing, the deionized water, HEP, and preservative were added, after another period of mild mixing, the pH modifier was added. Then, the surfactant was added, and after mixing, the ink was filtered.

The ink composition was 16.4% solids. Viscosity of the liquid ink at 32 degrees Celsius was 4.92 cP and the pH was 9.2. Surface tension at 25 degrees Celsius was 43.68 dynes/cm.

EXAMPLE 4

A second white ink composition useful in the present disclosure was prepared having the following formulation:
44.5% by weight deionized water,
23.4% by weight polymer dispersion (Takelac® AC WS-4000) (29% solids),
15.4% by weight titanium oxide dispersion (Cyclojet White TI-7530),
7.7% by weight humectant (2-hydroxyethyl pyrrolidone),
3.0% by weight surface tension modifier (2-butoxy ethanone),
3.4% by weight humectant (ethylene glycol),
1.7% by weight levelling agent (Silwet® Hydrostable 212),
0.7% by weight surfactant (Surfynol® 465),
0.1% by weight pH modifier (dimethylethanolamine), and
0.08% by weight preservative (Proxel® GXL)

The ink composition was 14.7% solids. Viscosity of the liquid ink at 32 degrees Celsius was 6.03 cP and the pH was 8.6. Surface tension at 25 degrees Celsius was 31.44 dynes/cm.

EXAMPLE 5

A metallic ink composition useful in the present disclosure was prepared having the following formulation:
85.4% by weight aluminum dispersion (Eckart Jetfluid® SB11028),
9.5% by weight solvent (dimethyl sulfoxide), and
5.1% by weight polymer solution (DER 684-EK40 epoxy resin, 20% solids in dimethyl sulfoxide)

The aluminum dispersion, the polymer, and the aprotic solvent were mildly mixed. After a period of mild mixing, the ink was filtered.

The ink composition was 4% solids. Viscosity of the ink at 32 degrees Celsius was 4.98 cP. Dynamic surface tension at 25 degrees Celsius was 31.8 dynes/cm, and static surface tension was 29.7 dynes/cm.

All of the formulations of Examples 1-5 produced valuable printing inks with acceptable immediate and long term durability.

INDUSTRIAL APPLICABILITY

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure. Numerous modifications to the present disclosure will be apparent to those skilled in the art in view of the foregoing description. It should be understood that the illustrated embodiments are exemplary only, and should not be taken as limiting the scope of the disclosure.

We claim:
1. An aqueous ink comprising:
   a first urethane silanol polymer and a second urethane silanol polymer;
   from about 0.5 to about 12% by weight of one or more colorants;
   from about 5 to about 35% by weight of a solvent;
   from about 0.03 to about 1.0% by weight of a pH modifier; and
   water, wherein the aqueous ink has a viscosity such that the aqueous ink can be applied to a non-absorbent surface layer, wherein the first urethane silanol polymer is polycarbonate based and is about 5.5% by weight and the second urethane silanol polymer is polyester based and is about 0.3% by weight.
2. The aqueous ink of claim 1, wherein the viscosity is from about 1 to about 20 mPa-s.
3. The aqueous ink of claim 1, further comprising from about 0.1 to about 5% by weight of a surfactant.
4. The aqueous ink of claim 1, further comprising from about 1 to about 20% by weight of a crosslinker.
5. The aqueous ink of claim 4, wherein the crosslinker is an iso-cyanate crosslinker.
6. The aqueous ink of claim 1, wherein the first urethane silanol and the second urethane silanol polymer are a self-crosslinking urethane silanol polymers.

7. The aqueous ink of claim 1, wherein the solvent is chosen from the group consisting of 1-(2-hydroxyethyl)-2-pyrrolidone, alcohols, polyols, glycerols, and glycols.

8. The aqueous ink of claim 4, wherein the surfactant is an ethoxylated molecule.

9. The aqueous ink of claim 1, wherein the pH modifier is dimethylethanolamine.

10. The aqueous ink of claim 1, wherein the ink has a dynamic surface tension at 25 degrees Celsius from about 20 to about 45 dynes/cm.

11. A method for high speed variable printing comprising the steps of:
 providing an aqueous ink, the aqueous ink comprising:
 a first urethane silanol polymer and a second urethane silanol polymer, wherein the first urethane silanol polymer is polycarbonate based and is about 5.5% by weight and the second urethane silanol polymer is polyester based and is about 0.3% by weight;
 from about 0.5 to about 12% by weight of a pigment;
 from about 5 to 35% by weight of a solvent;
 from about 0.03 to about 1.0% by weight of a pH modifier; and
 water, wherein the aqueous ink has a viscosity from about 1 to about 20 mPa-s; and
 applying the aqueous ink onto a non-absorbent substrate in a first layer.

12. The method of claim 11, the method further comprising the step of applying the aqueous ink in a plurality of further layers.

13. The method of claim 11, wherein the aqueous ink further comprises from about 0.1 to about 5.0% by weight of a surfactant.

14. The method of claim 11, the method further comprising the step of applying heat to crosslink the first urethane silanol polymer and the second urethane silanol polymer of the aqueous ink.

15. The aqueous ink of claim 1, wherein the aqueous ink has a ratio of colorant to polymer between about 2:1 and about 1:2 by weight.

16. The aqueous ink of claim 1, wherein the aqueous ink has a total solids content of less than about 20% by weight.

17. The aqueous ink of claim 2, wherein the aqueous ink has a viscosity from about 4 to 14 mPa-s.

* * * * *